United States Patent [19]
McFarland

[11] Patent Number: 5,580,305
[45] Date of Patent: Dec. 3, 1996

[54] METHOD AND MACHINE FOR SEGREGATING MEAT FROM BONE, HEAVY TISSUE, AND SKIN

[76] Inventor: Archie R. McFarland, 84 High Country Rd., Herriman, Utah 84065

[21] Appl. No.: 460,651

[22] Filed: Jun. 2, 1995

[51] Int. Cl.$^6$ .......................... B02C 19/22; A22C 17/00
[52] U.S. Cl. ............................................. 452/138; 241/74
[58] Field of Search ........................... 452/138, 135; 241/74, 82.3, 823, 247, 260.1

[56] References Cited

U.S. PATENT DOCUMENTS

| | | | |
|---|---|---|---|
| Re. 31,631 | 7/1984 | McFarland | 241/74 |
| 4,189,104 | 2/1980 | dos Santos | 241/82.3 |
| 4,566,640 | 1/1986 | McFarland et al. | 241/74 |
| 4,638,954 | 1/1987 | Poss | 241/74 |
| 5,160,290 | 11/1992 | Richburg | 452/138 |
| 5,213,541 | 5/1993 | Richburg et al. | 452/135 |

FOREIGN PATENT DOCUMENTS 30131  6/1981  European Pat. Off. ............... 452/138

*Primary Examiner*—Willis Little
*Attorney, Agent, or Firm*—Mallinckrodt & Mallinckrodt

[57] ABSTRACT

A machine for segregating meat from bone, heavy tissue, and skin and having a material conveying screw mounted for rotation within a perforated conduit serving as a screen through which the meat is extruded as the bone, heavy tissue, and skin are conveyed toward the discharge end of the machine, is provided with a cutter ring with a cutting face against which the bone, heavy tissue, and skin are projected and cut before discharge. The conveying screw is preferably a cutter screw having a spiral flight which bears against the inside of the screen and contacts the margins of the perforations of the screen in a close cutting action as the screw rotates. Feeding cut meat and bone into the machine and operating the machine constitutes the method of the invention.

18 Claims, 1 Drawing Sheet

METHOD AND MACHINE FOR SEGREGATING MEAT FROM BONE, HEAVY TISSUE, AND SKIN

BACKGROUND OF THE INVENTION

1. Field

The invention is in the field of machines for separating meat from bone and from so-called "bony" matter which includes connective and other heavy tissues, skin, etc. Such machines have become known as "deboning" machines and comprise a conveying screw rotating within a tubular conduit that is provided with a multiplicity of small holes as a screen through which the relatively soft meat component is extruded under pressure as the bone and bony matter is advanced to a discharge outlet that is usually provided with a restrictive ring valve arrangement for effecting and controlling back-pressure within the machine.

2. State of the Art

Deboning machines have evolved through the years from that disclosed by McFarland U.S. Pat. No. 3,739,994 issued Jun. 19, 1973 (reissued Jul. 17, 1984 under Re. U.S. Pat. No. 31,631), which was the first to provide for the building up of a filter mat along the inside surface of a perforate tubular conduit as a screen through which the meat must pass before being expelled as filtered largely free of bone particles. The desired filter mat was created by leaving a small clearance between the outer edge surface of the spiral flights of an auger feed screw and the inner surface of the screen. The bone and bony matter was passed through an adjustably restrictive, annular orifice formed between the inside surface of a ring movable longitudinally relative to an extension of the auger screw and leading to a discharge outlet for the bone and bony matter. An additional feature was the provision, in an alternative embodiment of the machine, of a pair of knife blades freely inset into receiving notches in and along the flights of the auger screw, with sharp edges of such blades bearing lightly against the inner wall of the screen so as to cut fibers that create drag, but without destroying the filter mat.

U.S. Pat. No. 4,189,104 of Feb. 19, 1980 to Claudio dos Santos discloses an improved machine, wherein the face of the ring valve confronting the advancing bone and bony material being passed to and through the restrictive annular orifice is scalloped to cooperate with a correspondingly scalloped end portion of the auger screw extension in effecting a more rapid passage of material through the machine to increase output per unit time.

McFarland U.S. Pat. No. 4,566,640 of Jan. 28, 1986 speaks of grooves and vanes (the lands between the grooves) on an extension of the auger screw for grinding or chopping disjointed neck or spinal bones into sufficiently small particles to pass through the restricted annular orifice between the stationary ring and the extension portion of the rotating auger screw.

Machines of a type that have been made to operate on relatively large, unground pieces of meat and bone have suffered by low throughput and failure to cope with the larger pieces of bones, heavy tissues, and skin.

SUMMARY OF THE INVENTION

I have now improved machines of the type concerned to greatly increase throughput and thereby greatly increase output of the desired meat product, particularly where fairly large pieces of unground and refrigerated or frozen meat and bone are being fed thereinto.

It should be realized that government agencies controlling the sale of food products have various arbitrary definitions for terms such as meat, flesh, poultry, etc., which govern the amount of bone, heavy tissue, skin, and the like that may be included in a final product offered for sale. Therefore, limiting the content of such extraneous matter in a final product is becoming more and more important.

Accordingly, besides increasing throughput, a primary objective of the invention is to enable more effective control of the separation procedure and discharge of relatively large pieces of bone, heavy tissue, and skin by paying attention to structural details that heretofore have not been regarded as important.

From the standpoints of both increased throughput and coping with relatively large pieces of bone, connective tissue, and skin, I have made the adjustable, back-pressure, choke ring of prior machines into a cutter ring by providing cutting means on the cutting face thereof that confronts the outflowing mass of bone, heavy tissue, and skin traveling toward the discharge outlet of the machine. From the standpoint of control in a machine utilizing this concept of a cutter ring, blade members on the annular cutting face confronting a usually narrower annular face on the discharge end portion of a conveying screw or on an extension thereof, which confronting faces define between them a restrictive annular orifice as in earlier machines, the cutting means are preferably a series of mutually spaced and elongate cutter elements inset into and preferably progressively protruding from the cutting face of the ring along their lengths. Moreover, for best results, the cutting elements are disposed at an acute angle to the radial.

Preferably also, the creation of a filter mat has purposely been avoided by making the flights of the feed screw sharp, as a continuous spiral blade, and bearing closely against the inside surface of the screen to effect a strong cutting action relative to the perforations thereof along the length of such screen, thereby avoiding the creation of a filter mat.

From a method standpoint, throughput of material along a machine of the type concerned is enhanced by passing the stream of separated bone, heavy tissue, and any skin that may be present into the face of a cutter ring equipped with sharp cutter elements arranged for cutting action on such bone and heavy tissue as they travel toward the discharge outlet therefor. At the same time, pieces of heavy tissue or skin that become stuck in the tiny holes of the screen and drag as the material travels along the axis of the machine are cut free by the cutter feed screw, rather than remaining as part of a filter mat, and are therefore carried on toward and through the cutter ring and the discharge outlet of the machine.

In some instances, it may be desirable to provide for rotating the normally stationary cutter ring so as to effect a combined action with the rotating cutter screw and extension thereof, whether or not such cutter screw or extension is also provided with cutting means.

THE DRAWINGS

The best mode presently contemplated for carrying out the invention is illustrated in the accompanying drawings, in which:

FIG. 1 is a fragmentary, vertical, longitudinal section taken axially through and along the screen and the cutter screw portion of a typical segregating machine of the invention and on through the cutter ring and restricted annular orifice;

FIG. 2, a portion of FIG. 1 encircled by the line 2 in FIG. 1 and drawn to a larger scale;

FIG. 3, a side elevation of the cutter ring per se;

FIG. 4, a perspective view of the cutter ring of FIG. 3 looking toward the cutting face thereof;

FIG. 5, a front elevation of the cutter ring of FIGS. 3 and 4;

FIG. 6, an axial vertical section taken on the line 6—6 of FIG. 5.

DETAILED DESCRIPTION OF THE ILLUSTRATED EMBODIMENT

Figure 1:
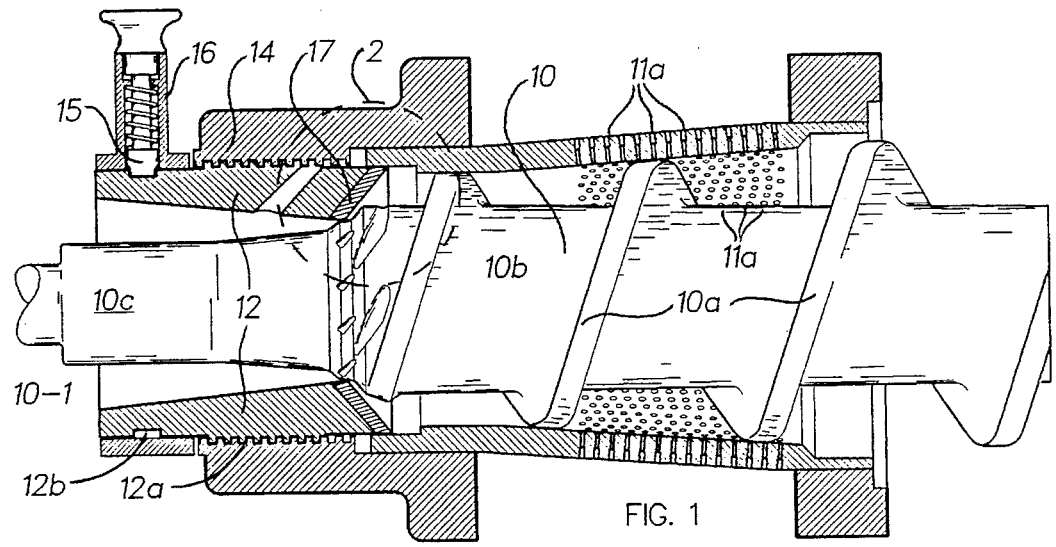
Figure 2:
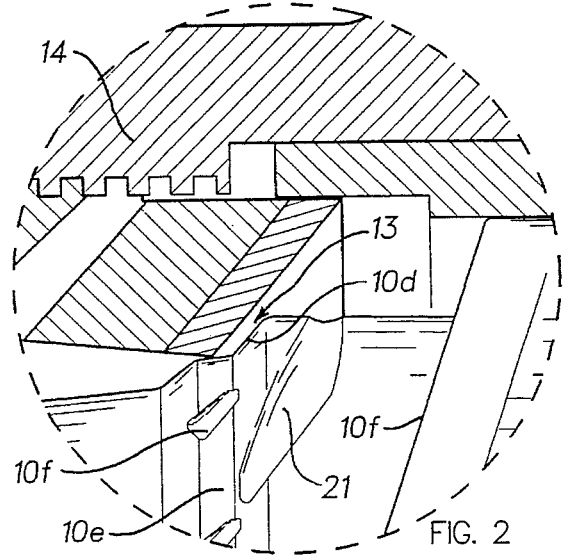
Figure 4:
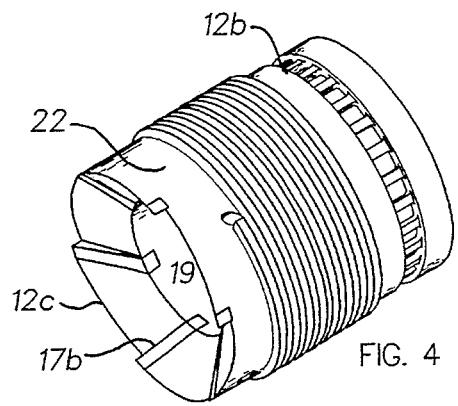
Figure 6:
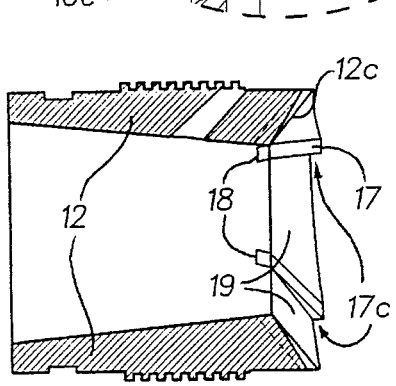
Figure 3:
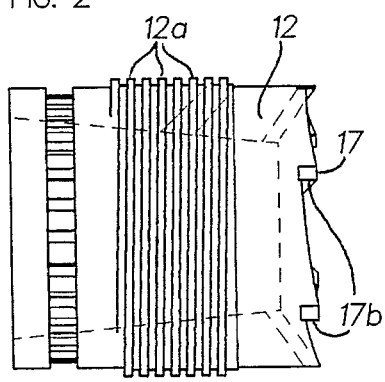

In the form illustrated, the machine of the invention comprises a conveying screw or auger formed as a cutter screw 10 having a spiral flight 10a and extending through and adapted to rotate within a perforate tubular conduit or screen 11 while conveying pieces of meat and bone and other relatively heavy tissue, such as tendons and gristle, and skin, along the interior of screen 11 from a feed end of such screw (not shown), receiving the material to be treated, to a discharge end portion 10b thereof and through a final outlet opening 10-1 surrounding an end extension 10c of such cutter screw after end portion 10b passes through a cutter ring 12 and, as here shown, a restrictive annular orifice 13, FIG. 2, for the bones and heavy tissue that do not pass through the tiny perforations 11a of the screen along with the meat. Such end extension 10c of screw 10 connects with rotating means (not shown) beyond final outlet opening 10-1.

As is typical of choke rings of machines of the type concerned, cutter ring 12 is elongate, externally threaded, as at 12a, and rotatable within an internally threaded housing member 14 for back and forth, longitudinal, position-adjusting movement relative to such housing member 14 and to the discharge end portion 10b of cutter screw 10 and the end extension 10c thereof. A spring-activated pawl 15, mounted within a housing member 16 and engaging a ratchet wheel portion 12b of cutting ring 12, provides for manually turning of ring 12 in the appropriate direction for screwing such ring forwardly or backwardly so that the cutting face 12c thereof is in a desired adjusted position relative to the discharge end portion 10b of the cutter screw and, preferably, as shown, relative to a confronting annular face 10d, FIG. 2, thereof.

The annular cutting end of cutter ring 12 is concave as is customary for choke rings of prior machines, placing cutting face 12c at an acute angle to the longitudinal axis of the machine and sloping inwardly.

Figure 5:
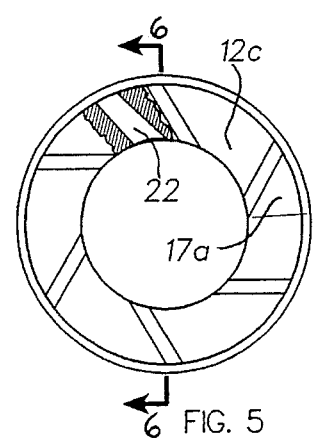

In accordance with the invention, cutting face 12c of cutter ring 12 is provided with cutting means, which, as here shown, comprises a series of mutually spaced blades 17, each extending across such annular cutting face at a slope, from the inner to the outer circumference thereof in the direction of rotation of the feed screw, of preferably about forty-five degrees from the radial, see the angle 17a, FIG. 5, between the blade 17 and the radius indicated by the applied light line.

The blades 17, as shown, are preferably square or otherwise rectangular in cross-section and inset into and secured within corresponding receiving grooves 18 formed in cutting face 12c, such grooves advantageously each progressively lessening in depth from the inner circumference of such cutting face to the outer circumference thereof, so that the distances of exposed cutting edges 17b of the respective blades above the respective lands 19 between adjacent blades progressively increase correspondingly from such inner circumference to such outer circumference providing relief spaces 17c between such blades. However, the blade edges could be completely above the cutting face, and any increase in distance above the cutting face need not be progressive along the length of the blade element. The blades should be of tungsten carbide or similar extra hard and durable cutting material.

As shown, the forward end of cutter ring 12 engages an annular seat 10e, typically from about one-sixteenth to one-eighth of an inch in width formed about the discharge end portion 10b of the cutter screw, with the cutting face of ring 12 confronting face 10d of the cutter screw. Seat 10e may be provided, as shown in FIG. 2, with divergent recesses 10f for passage of matter therethrough despite choke action of the cutter ring and advantageously slopes outwardly in the direction of material travel so that restrictive orifice 13 progressively increases in size as cutter ring 12 is moved in that direction. It is also advantageous that confronting face 10d of the cutter screw slope less steeply than does cutting face 12c, see FIG. 2, so that annular orifice 13 provides relief space between such confronting faces.

I have found that, for most effective meat output, the flight pitch (distance between consecutive flight turns) for the cutter screw should be at least approximately four inches. The cutter screw can taper from feed end to discharge end as shown, but need not.

It is advantageous to also provide material-forwarding recesses 21 as a circular series thereof in the discharge end portion 10b of the cutter screw, and to provide at least one opening 22 through the annular wall of the cutter ring intersecting the interengaging threads between cutter ring 12 and housing member 14 to pass, internally of the cutter ring, any matter caught between the threads.

For most effective cutting action with respect to the perforations of screen 11, the normally rounded, spiral, outer ends of flight 10a of cutter screw 10 should be flattened somewhat and provided with a cutting edge 10f facing the direction of material travel within and along the screen. Such cutter screw bears closely against the inside surface of the screen for cutting contact with the margins of the perforations thereof as it rotates.

Constructed as shown, a machine of the invention operating on an input of 22,000 pounds of unground poultry will produce from about 16,000 to 17,000 pounds of useable meat per hour. This means that unground mixtures of many types of meat with bone can be effectively and economically handled by the machine of the invention.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A machine for segregating meat from bone and from heavy tissue and skin of segmented pieces of meat cuts, comprising an open-ended, perforate, tubular conduit as a meat-passing screen through which the meat is extruded; a rotatable conveying screw within said conduit for advancing pieces of meat and any accompanying bone, heavy tissue, and skin as introduced into said conduit at one open end thereof and for discharging such bone, heavy tissue, and skin at the other open end thereof, said screw having a discharge end portion at said other end of the conduit; a cutter ring mounted at said other open end of the conduit and having a cutting face confronting the discharge end portion of said screw; and cutting means carried by and projecting outwardly beyond said cutting face of the cutter ring as cutting blades.

2. A machine according to claim 1, wherein the cutting means carried by the cutting face of the cutter ring is made up of a circular series of elongate blade elements having cutting edges extending across said cutting face of the cutter ring.

3. A machine according to claim 1, wherein the discharge end portion of the cutter screw is shouldered as a bearing seat for receiving an inner, circumferential end portion of the cutter ring and is provided with material-forwarding recesses.

4. A machine for segregating meat from bone and from heavy tissue and skin of segmented pieces of meat cuts, comprising an open-ended, perforate, tubular conduit as a meat-passing screen through which the meat is extruded; a rotatable conveying screw within said conduit for advancing pieces of meat and any accompanying bone, heavy tissue, and skin as introduced into said conduit at one open end thereof and for discharging such bone, heavy tissue, and skin at the other open end thereof, said screw having a discharge end portion at said other open end of the conduit; a cutter ring mounted at said other open end of the conduit and having a cutting face confronting the discharge end portion of said screw; cutting means carried by said cutting face of the cutter ring and made up of a circular series of elongate blade elements having cutting edges extending across said cutting face of the cutter ring, the respective blade elements and the cutting edges thereof extending at an angle of about forty-five degrees to the radius of the cutter ring.

5. A machine for segregating meat from bone and from heavy tissue and skin of segmented pieces of meat cuts, comprising an open-ended, perforate, tubular conduit as a meat-passing screen through which the meat is extruded; a rotatable conveying screw within said conduit for advancing pieces of meat and any accompanying bone, heavy tissue, and skin as introduced into said conduit at one open end thereof and for discharging such bone, heavy tissue, and skin at the other open end thereof, said screw having a discharge end portion at said other open end of the conduit; a cutter ring mounted at said other open end of the conduit and having a cutting face confronting the discharge end portion of said screw; cutting means carried by said cutting face of the cutter ring and made up of a circular series of elongate blade elements having cutting edges extending across and projecting outwardly beyond said cutting face of the cutter ring, the respective blade elements and the cutting edges projecting progressively a greater distance from the cutting face as they cross said cutting face from the inner circumference thereof to the outer circumference thereof.

6. A machine according to claim 5, wherein the discharge end portion of the cutter screw is shouldered and recessed transversely at intervals to receive an inner, circumferential end portion of the cutter ring as a bearing seat therefor yet still passes matter therethrough.

7. A machine according to claim 5, wherein the conveying screw has a spiral flight with flight pitch at least approximately four inches.

8. A machine for segregating meat from bone, heavy tissue, and skin of segmented pieces of meat and bone, comprising an open-ended, perforate, tubular conduit as a meat-passing screen through which the meat is extruded; a rotatable cutter screw within said conduit and having a spiral cutting flight bearing closely against the inside surface of the screen in cutting contact with the margins of the perforations thereof as said screw rotates for advancing pieces of meat and bone introduced into said conduit at one open end thereof and for discharging bone, heavy tissue, and skin at the other open end thereof, said cutter screw having a discharge end portion at said other open end of the conduit; a cutter ring mounted at said other open end of the conduit, said cutter ring having an annular cutting face confronting the discharge end portion of the cutter screw to provide a restrictive annular orifice for the bone, heavy tissue, and skin to be discharged from the machine; and cutting means carried by and projecting outwardly beyond said cutting face of the cutter ring and confronting the discharge end of said cutting screw.

9. A machine according to claim 8, wherein the cutting means carried by the cutting face of the cutter ring is made up of a circular series of elongate blade elements extending across said cutting face of the cutter ring.

10. A machine according to claim 8, wherein the discharge end of the cutter screw has an annular face confronting at least a portion of the cutting face of the cutter ring.

11. A machine according to claim 10, wherein an annular series of material-forwarding recesses are formed in the discharge end portion of the cutter screw.

12. A machine for segregating meat from bone and from heavy tissue and skin of segmented pieces of meat cuts, comprising an open-ended, perforate, tubular conduit as a meat-passing screen through which the meat is extruded; a rotatable cutter screw within said conduit and having a spiral cutting flight bearing closely against the inside surface of the screen in cutting contact with the margins of the perforations thereof as said screw rotates for advancing pieces of meat and any accompanying bone, heavy tissue, and skin as introduced into said conduit at one open end thereof and for discharging bone, heavy tissue, and skin at the other open end thereof, said cutter screw having a discharge end portion at said other open end of the conduit; a cutter ring mounted at said other open end of the conduit, said cutter ring having an annular cutting face confronting the discharge end portion of the cutter screw to provide a restrictive annular orifice for such bone, heavy tissue, and skin to be discharged from the machine; and cutting means carried by and projecting outwardly beyond said cutting face of the cutter ring and confronting the discharge end of said cutting screw as cutting blades, said cutting means as carried by the cutting face of the cutter ring being made up of a circular series of elongate blade elements extending across said cutting face of the cutter ring at an angle to the radius of the cutter ring.

13. A machine according to claim 12, wherein the angle is about forty-five degrees.

14. A machine according to claim 12, wherein the individual blade elements of the series are independent of one another and secured within and along corresponding grooves, respectively, in the cutting face of the cutter ring, the grooves each progressively lessening in depth from the inner circumference of said cutting face to the outer circumference thereof so that the distances of cutting edges of the respective blades above respective lands between adjacent blades increase correspondingly from said inner circumference to said outer circumference.

15. A machine according to claim 12, wherein the individual blade elements of the series are independent of one another and secured within and along corresponding grooves, respectively, in the cutting face of the cutter ring, the grooves each progressively lessening in depth from the inner circumference of said cutting face to the outer circumference thereof so that the distances of cutting edges of the respective blades above respective lands between adjacent blades increase correspondingly from said inner circumference to said outer circumference.

16. A machine according to claim 12, wherein the cutter ring has at least one opening through the annular wall of the cutter ring intersecting the threads between the cutter ring and a housing member in which said cutter ring is mounted to pass internally of said cutter ring any matter caught between the threads.

17. A method of segregating meat from bone and from any accompanying heavy tissue and skin of segmented pieces of meat cuts, comprising introducing segmented pieces of meat cuts into the feed end of a machine having a conveying screw rotatably mounted within and extending along an open-ended, perforate, tubular conduit serving as a meat-passing screen through which the meat is extruded, said screw having a discharge end portion at the other open end of said conduit; a cutter ring mounted at said other open end of the conduit and having a cutting face confronting the discharge end portion of said screw; and cutting means carried by and projecting outwardly beyond said cutting face of the cutter ring as cutting blades; and rotating said screw for extruding meat through the perforations of said conduit and for carrying such bone, heavy tissue, and skin against said cutting face and against the projecting blades of the cutter ring of the machine before discharging such bone, heavy tissue, and skin from the machine.

18. A method according to claim 17, wherein the conveying screw of the machine is a cutter screw having a spiral flight with a sharp cutting edge along its length that bears closely against the perforations at the inside surface of the screen and cuts heavy tissue, skin and the like as the screw rotates.

* * * * *